(12) United States Patent
Oketani (10) Patent No.: US 11,435,092 B2
(45) Date of Patent: Sep. 6, 2022

(54) ROTOR, ELECTRIC MOTOR, COMPRESSOR, AIR CONDITIONER, AND MANUFACTURING METHOD OF ROTOR

(71) Applicant: Mitsubishi Electric Corporation, Tokyo (JP)

(72) Inventor: Naohiro Oketani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 245 days.

(21) Appl. No.: 16/768,167

(22) PCT Filed: Dec. 7, 2017

(86) PCT No.: PCT/JP2017/043991
§ 371 (c)(1),
(2) Date: May 29, 2020

(87) PCT Pub. No.: WO2019/111374
PCT Pub. Date: Jun. 13, 2019

(65) Prior Publication Data
US 2020/0284443 A1    Sep. 10, 2020

(51) Int. Cl.
*H02K 1/27* (2022.01)
*H02K 15/03* (2006.01)
(Continued)

(52) U.S. Cl.
CPC .................. *F24F 1/22* (2013.01); *F24F 1/12* (2013.01); *H02K 1/06* (2013.01); *H02K 1/274* (2013.01);
(Continued)

(58) Field of Classification Search
CPC ..... F24F 1/22; F24F 1/12; H02K 1/06; H02K 1/2706; H02K 1/274; H02K 9/22;
(Continued)

(56) References Cited

U.S. PATENT DOCUMENTS

| 4,327,302 A | 4/1982 | Hershberger |
| 6,008,563 A | 12/1999 | Baba et al. |

(Continued)

FOREIGN PATENT DOCUMENTS

| CN | 1933297 A | 3/2007 |
| CN | 105164896 A | 12/2015 |

(Continued)

OTHER PUBLICATIONS

International Search Report of the International Searching Authority dated Feb. 13, 2018 for the corresponding international application No. PCT/JP2017/043991 (and English translation).

(Continued)

*Primary Examiner* — Thomas Truong
(74) *Attorney, Agent, or Firm* — Posz Law Group, PLC (57) ABSTRACT

A rotor includes a rare-earth magnet magnetized in a radial direction, a rotor core, and a thermal conduction sheet formed of a deformable material. The rotor core includes a first part, a thin-wall part including a second part that is harder than the first part, and a magnet insertion hole. The thin-wall part is situated between a region of end of the magnet insertion hole in a circumferential direction and an outer edge of the rotor core.

12 Claims, 8 Drawing Sheets

(51) Int. Cl.
  *F24F 1/22* (2011.01)
  *F24F 1/12* (2011.01)
  *H02K 1/274* (2022.01)
  *H02K 1/2706* (2022.01)
  *H02K 9/22* (2006.01)
  *H02K 1/06* (2006.01)

(52) U.S. Cl.
  CPC ............ *H02K 1/2706* (2013.01); *H02K 9/22* (2013.01); *H02K 15/03* (2013.01); *H02K 2205/00* (2013.01)

(58) Field of Classification Search
  CPC .... H02K 15/03; H02K 2205/00; H02K 9/223; H02K 2213/03; H02K 1/276
  See application file for complete search history.

(56) References Cited

U.S. PATENT DOCUMENTS

| | | | |
|---|---|---|---|
| 2007/0052313 A1 | 3/2007 | Takahashi et al. | |
| 2013/0134817 A1* | 5/2013 | Nagahama | H02K 1/27 29/598 |
| 2014/0077652 A1 | 3/2014 | Yamagishi et al. | |
| 2016/0065015 A1 | 3/2016 | Kameda et al. | |
| 2018/0062460 A1 | 3/2018 | Baba et al. | |
| 2018/0138763 A1* | 5/2018 | Nakamura | H02K 7/14 |

FOREIGN PATENT DOCUMENTS

| | | |
|---|---|---|
| CN | 107408850 A | 11/2017 |
| JP | H11-136897 A | 5/1999 |
| JP | H02-179253 A | 7/1999 |
| JP | 2002-010546 A | 1/2002 |
| JP | 2005-204352 A | 7/2005 |
| JP | 2006-002144 A | 1/2006 |
| JP | 2007-104888 A | 4/2007 |
| JP | 2007-215335 A | 8/2007 |
| JP | 2010-148161 A | 7/2010 |
| JP | 2013-115963 A | 6/2013 |
| JP | 2013-132115 A | 7/2013 |
| JP | 2015-091188 A | 5/2015 |
| JP | 2015-109772 A | 6/2015 |
| JP | 2016-005356 A | 1/2016 |
| JP | 2016-220412 A | 12/2016 |
| JP | 2017-028862 A | 2/2017 |
| WO | 2012/169043 A1 | 12/2012 |

OTHER PUBLICATIONS

Decision of Refusal dated Dec. 14, 2021 in connection with counterpart Japanese Patent Application No. 2019-557942, and a machine English translation.

Japanese Office Action dated Jun. 29, 2021 issued in corresponding JP Patent Application No. 2019-557942 (with English Machine Translation).

Japanese Office Action dated Jan. 19, 2021 issued in corresponding JP Patent Application No. 2019-557942 (with English Machine Translation).

Office Action dated Nov. 3, 2021, issued in corresponding CN Patent Application No. 201780097207.7 (and English Machine Translation).

Office Action dated Mar. 9, 2022 in connection with counterpart CN Patent Application No. 201780097207.7 (with machine English translation).

* cited by examiner

ROTOR, ELECTRIC MOTOR, COMPRESSOR, AIR CONDITIONER, AND MANUFACTURING METHOD OF ROTOR

CROSS REFERENCE TO RELATED APPLICATION

This application is a U.S. national stage application of International Patent Application No. PCT/JP2017/043991 filed on Dec. 7, 2017, the disclosure of which is incorporated herein by reference.

TECHNICAL FIELD

The present invention relates to a rotor used for an electric motor.

BACKGROUND

IPM (Interior Permanent Magnet) motors of the inner rotor type are generally used. In an IPM motor, magnetic flux flowing from a stator into a rotor changes according to the rotation of the rotor. Accordingly, an eddy current occurs in a rotor core and permanent magnets fixed to the rotor core and the temperature rises in the rotor core and the permanent magnets. The temperature rise of the permanent magnets causes a decrease in magnetic force and coercive force. Therefore, it is being requested to efficiently discharge the heat of the permanent magnets to the rotor core. To meet this request, there has been proposed a method in which a gap between an inner wall of a magnet insertion hole and a permanent magnet is filled in with an adhesive agent containing filler having high thermal conductivity or a film having high thermal conductivity (see Patent Reference 1, for example).

Patent Reference

Patent Reference 1: Japanese Patent Application Publication No. 2007-215335

However, in the case where an adhesive agent is used, there is a problem in that the manufacturing cost rises in regard to management of the amount of use of the adhesive agent, management of the time of hardening the adhesive agent, and so forth. On the other hand, in the case where a film is used, there is a problem in that it is difficult to dispose the film between the inner wall of the magnet insertion hole and the permanent magnet so as not to leave clearance and it is difficult to efficiently discharge the heat of the permanent magnets to the rotor core.

SUMMARY

An object of the present invention is to provide a rotor capable of efficiently discharging heat of a permanent magnet of the rotor.

A rotor according to the present invention includes: a rare-earth magnet magnetized in a radial direction; a rotor core including a first part, a thin-wall part including a second part that is harder than the first part, and a magnet insertion hole in which the rare-earth magnet is inserted; and a thermal conduction sheet disposed between the rare-earth magnet and an inner wall of the magnet insertion hole and to conduct heat of the rare-earth magnet to the rotor core, the thermal conduction sheet being formed of a deformable material. The thin-wall part is situated between a region of end of the magnet insertion hole in a circumferential direction and an outer edge of the rotor core. The second part is a part that is work hardened due to plastic deformation.

According to the present invention, a rotor capable of efficiently discharging heat of a permanent magnet of the rotor can be provided.

DETAILED DESCRIPTION

First Embodiment

Figure 1:
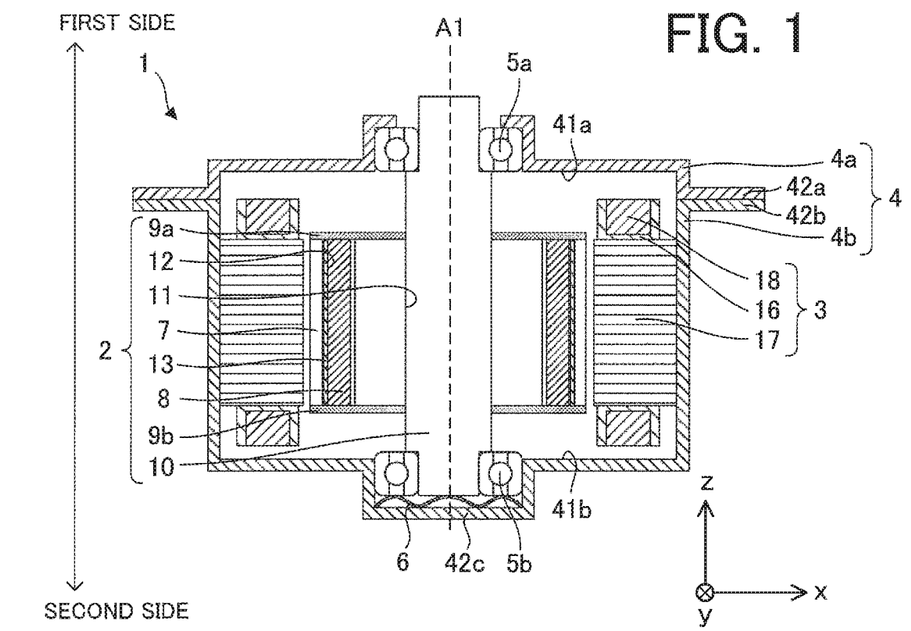
FIG. 1 is a vertical sectional view schematically showing a structure of an electric motor according to a first embodiment of the present invention.

FIG. 1 is a vertical sectional view schematically showing a structure of an electric motor 1 according to a first embodiment of the present invention.

In an xyz orthogonal coordinate system shown in each drawing, a z-axis direction (z-axis) represents a direction parallel to an axis line A1 of a shaft 10 of the electric motor 1 (i.e., rotation axis of a rotor 2) (referred to also as an "axial direction of the rotor 2" or simply as an "axial direction"), an x-axis direction (x-axis) represents a direction orthogonal to the z-axis direction (z-axis), and a y-axis direction represents a direction orthogonal to both of the z-axis direction and the x-axis direction.

The electric motor 1 is an IPM motor of an inner rotor type, for example.

The electric motor 1 includes the rotor 2, a stator 3, a frame 4, a bearing 5a, a bearing 5b and a compression spring 6. In the following description, an upper side (i.e., +z side) in FIG. 1 will be referred to as a first side (referred to also as an A side), and a lower side (i.e., -z side) will be referred to to as a second side (referred to also as a B side). In the example shown in FIG. 1, the first side is the load side of the electric motor 1 and the second side is the anti-load side of the electric motor 1; however, it is permissible even if the second side is the load side and the first side is the anti-load side.

The bearing 5a and the bearing 5b rotatably support the rotor 2. The bearing 5a is fixed on the first side of the frame 4 (specifically, on a frame part 4a), while the bearing 5b is fixed on the second side of the frame 4 (specifically, on a frame part 4b).

The frame 4 covers the stator 3. The frame 4 is formed of metallic material such as iron or aluminum. In this embodiment, the frame 4 is formed of the frame parts 4a and 4b. Specifically, the frame 4 is separated into two frames (i.e., the frame parts 4a and 4b) by a plane orthogonal to the rotation axis of the rotor 2. Each of the frame parts 4a and 4b is formed in a cuplike shape.

The frame 4 has an interior surface 41a (first interior surface) formed on one side (the first side shown in FIG. 1) in the axial direction and an interior surface 41b (second interior surface) formed on the other side (the second side shown in FIG. 1) in the axial direction.

The frame part 4a has a flange part 42a formed on an opening side and the interior surface 41a. The frame part 4a supports the first side of the rotor 2 via the bearing 5a.

The frame part 4b has a flange part 42b formed on an opening side, the interior surface 41b, and a closed bottom part 42c. The frame part 4b supports the second side of the rotor 2 via the bearing 5b. The stator 3 is fixed in the frame part 4b.

The flange part 42a of the frame part 4a is in contact with the flange part 42b of the frame part 4b. The flange part 42a of the frame part 4a is fixed to the flange part 42b of the frame part 4b by an adhesive agent, screws or welding, for example.

The compression spring 6 is disposed between the closed bottom part 42c of the frame part 4b and the bearing 5b. The compression spring 6 provides a preload to the bearing 5b. Accordingly, the preload is provided also to the bearing 5a. As the compression spring 6, a wave washer or the like is used, for example.

Figure 2:
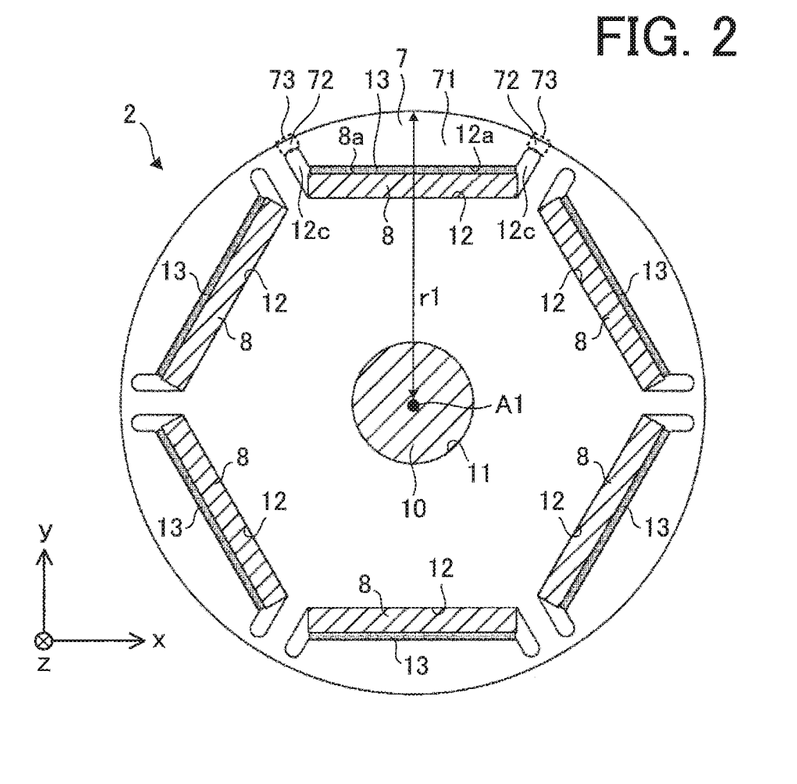
FIG. 2 is a cross-sectional view schematically showing a structure of a rotor.

FIG. 2 is a cross-sectional view schematically showing a structure of the rotor 2.

The rotor 2 includes a rotor core 7, permanent magnets 8, an end plate 9a (FIG. 1), an end plate 9b (FIG. 1), the shaft 10, and thermal conduction sheets 13. The rotor 2 is disposed inside the stator 3.

The rotor core 7 includes first parts 71, thin-wall parts 73 each including a second part 72, a shaft hole 11, and magnet insertion holes 12. The second part 72 is harder than the first part 71. The thin-wall part 73 is a region as a part of the rotor core 7 surrounded by broken lines.

The rotor core 7 is formed by, for example, laminating a plurality of electromagnetic steel sheets punched out in a predetermined shape in the axial direction. Thus, at least one electromagnetic steel sheet of the rotor core 7 includes the first parts 71, the thin-wall parts 73 each including the second part 72, the shaft hole 11, and the magnet insertion holes 12. As shown in FIG. 2, the cross-sectional shape (i.e., plan-view shape orthogonal to the axial direction) of the rotor core 7 is a circular shape. However, the cross-sectional shape of the rotor core 7 does not have to be a perfect circle.

The shaft hole 11 is a through hole passing through the rotor core 7 in the axial direction. The shaft 10 is inserted in the shaft hole 11. The center of the shaft hole 11 in a radial direction of the rotor 2 (referred to also as a "radial direction of the stator 3" or simply as a "radial direction") coincides with the center of the rotor core 7 in the radial direction.

In this embodiment, a plurality of magnet insertion holes 12 are formed in the rotor core 7 at even intervals in a circumferential direction of the rotor 2 around the axis line A1 (referred to also as a "circumferential direction of the stator 3" or simply as a "circumferential direction"). The magnet insertion hole 12 is a through hole passing through the rotor core 7 in the axial direction. On an xy plane, the magnet insertion hole 12 extends in a direction orthogonal to the radial direction. Each magnet insertion hole 12 is formed closer to an outer circumferential surface of the rotor core 7 than the shaft hole 11.

In this embodiment, one permanent magnet 8 is inserted in each magnet insertion hole 12. The method of disposing the permanent magnet(s) 8 in each magnet insertion hole 12 is not limited to that in this embodiment. Two or more permanent magnets 8 may be inserted in each magnet insertion hole 12.

The permanent magnet 8 is a rare-earth magnet, for example. However, a magnet other than a rare-earth magnet may also be used as the permanent magnet 8. The permanent magnet 8 is formed in a flat plate-like shape.

The thermal conduction sheet 13 is disposed between the permanent magnet 8 and an inner wall 12a of the magnet insertion hole 12. In other words, in the magnet insertion hole 12, the thermal conduction sheet 13 is situated outside the permanent magnet 8 in regard to the radial direction. In this case, the thermal conduction sheet 13 is sandwiched between an outside surface 8a of the permanent magnet 8 in regard to the radial direction and the inner wall 12a of the magnet insertion hole 12.

The thermal conduction sheet 13 conducts the heat of the permanent magnet 8 to the rotor core 7. The heat conducted to the rotor core 7 is discharged to the outside of the rotor 2. The thermal conduction sheet 13 is formed of a deformable material. The deformation of the thermal conduction sheet 13 is, for example, elastic deformation or plastic deformation, or both of them. Specifically, the thermal conduction sheet 13 is compressed in the radial direction. The thermal conduction sheet 13 is in contact with the inner wall 12a of the magnet insertion hole 12 and the permanent magnet 8 tightly in a state where the thermal conduction sheet 13 is deformed.

The thermal conduction sheet 13 is formed of material containing silicone, for example. The thermal conduction sheet 13 may be formed of material other than material containing silicone, such as material containing acrylic resin.

The position of the thermal conduction sheet 13 is not limited to the example shown in FIG. 2.

Figure 3:
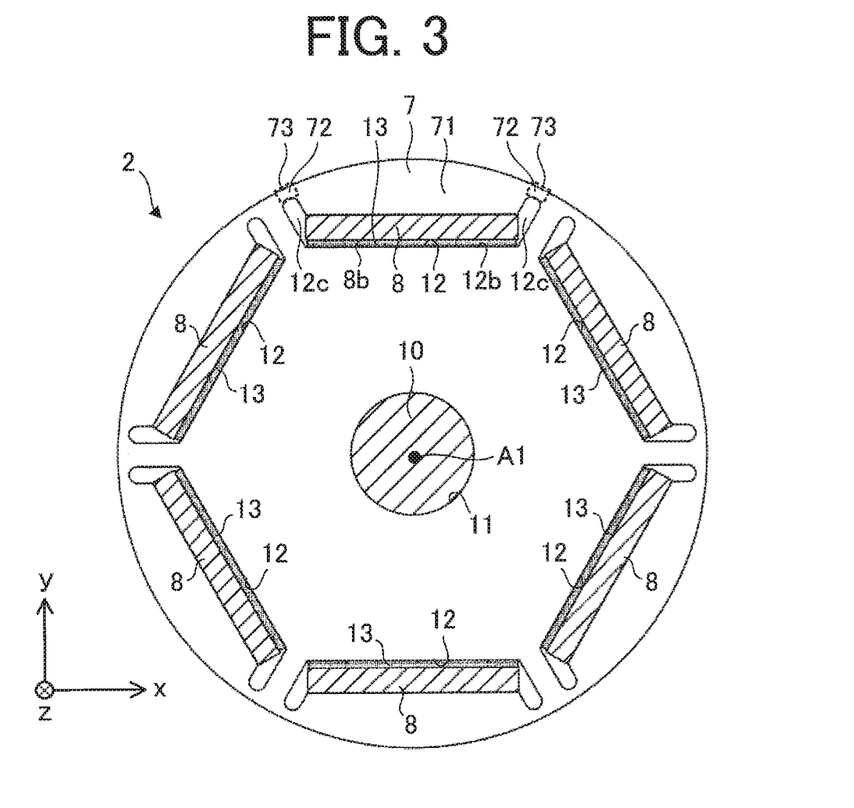
FIG. 3 is a cross-sectional view showing another example of the rotor.

FIG. 3 is a cross-sectional view showing another example of the rotor 2. As shown in FIG. 3, in the magnet insertion hole 12, the thermal conduction sheet 13 may also be situated inside the permanent magnet 8 in regard to the radial direction. In other words, the thermal conduction sheet 13 may be disposed between an inside surface 8b as an inside surface of the permanent magnet 8 in regard to the radial direction and an inner wall 12b of the magnet insertion hole 12. In this case, the thermal conduction sheet 13 is sandwiched between the inside surface 8b of the permanent magnet and the inner wall 12b of the magnet insertion hole 12.

The shape of the thin-wall part 73 is not limited to the example shown in FIG. 2.

Figure 4:
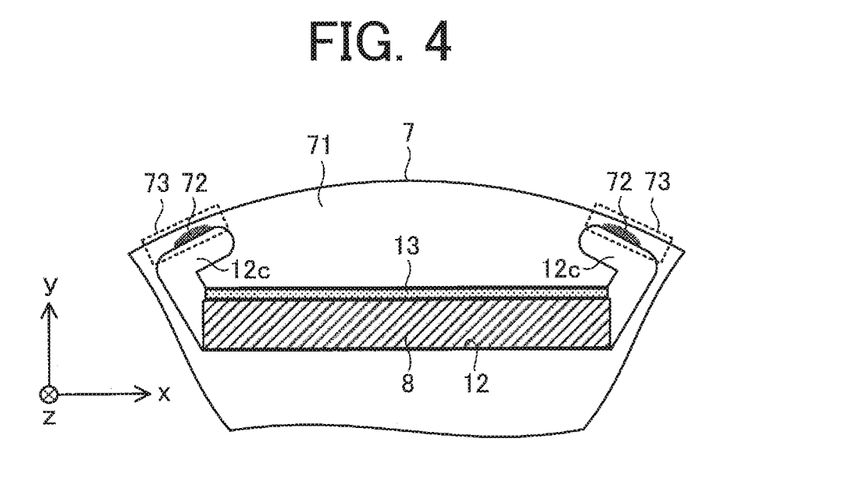
FIG. 4 is a diagram showing another example of the shape of a thin-wall part.

FIG. 4 is a diagram showing another example of the shape of the thin-wall part 73. In the example shown in FIG. 4, the thin-wall part 73 extends in the circumferential direction along an outer edge of the rotor core 7. With this configuration, the rotor core 7 can be deformed easily with a light load in a process of manufacturing the rotor 2 (step S3) which will be described later.

As shown in FIG. 1, the end plates 9a and 9b respectively cover openings of the magnet insertion hole 12 on the first side and the second side, by which the permanent magnet 8 is prevented from coming off the magnet insertion hole 12.

The cross-sectional shape (i.e., plan-view shape orthogonal to the axial direction) of the shaft 10 is a circular shape, for example. The shaft 10 is rotatably supported by the bearing 5a and the bearing 5b.

The stator 3 includes a stator core 17 formed in a ring-like shape, an insulator 16 for electrically insulating the stator core 17, and a winding 18 wound around the stator core 17 via the insulator 16. The stator 3 is formed in the circumferential direction in a ring-like shape. The stator 3 (specifically, the stator core 17) is held by the frame 4 (specifically, the frame part 4b). Inside the stator 3, the rotor 2 is provided to be rotatable.

The stator 3 is fixed in the frame 4 (specifically, the frame part 4b) by means of press fitting, welding or the like, and an outer circumferential surface of the stator core 17 is in contact with an inner surface of the frame part 4b.

The stator core 17 is formed by laminating a plurality of electromagnetic steel sheets punched out in a predetermined shape in the axial direction. The stator core 17 includes, for example, at least one yoke part (referred to also as a core back) and a plurality of tooth parts projecting inward in the radial direction. In this case, the plurality of tooth parts are arranged in a radial pattern around the axis line A1 and arranged at even intervals in the circumferential direction. A tip end of each tooth part inside in the radial direction faces the rotor 2. An air gap is formed between the tip end of the tooth part and the rotor 2.

The rotor core 7 includes a plurality of magnet insertion holes 12. In the example shown in FIG. 2, six magnet insertion holes 12 are formed in the rotor core 7. One permanent magnet 8 is disposed in each magnet insertion hole 12. The magnetization direction of the permanent magnet 8 is the radial direction. That is, the permanent magnet 8 is magnetized in the radial direction. In the rotor 2, each permanent magnet 8 functions as one magnetic pole for the stator 3. Regions in the magnet insertion hole 12 not occupied by the permanent magnet 8 are flux barriers 12c for regulating the direction of the magnetic flux.

In the rotor 2, one permanent magnet 8 functions as one magnetic pole for the stator 3, and another permanent magnet 8 adjoining in the circumferential direction functions as an opposite magnetic pole for the stator 3. That is, in the rotor 2, one permanent magnet 8 functions as the north pole for the stator 3, and another permanent magnet 8 adjoining in the circumferential direction functions as the south pole for the stator 3. Therefore, north poles and south poles are alternately arranged in the circumferential direction of the rotor 2.

Figure 5:
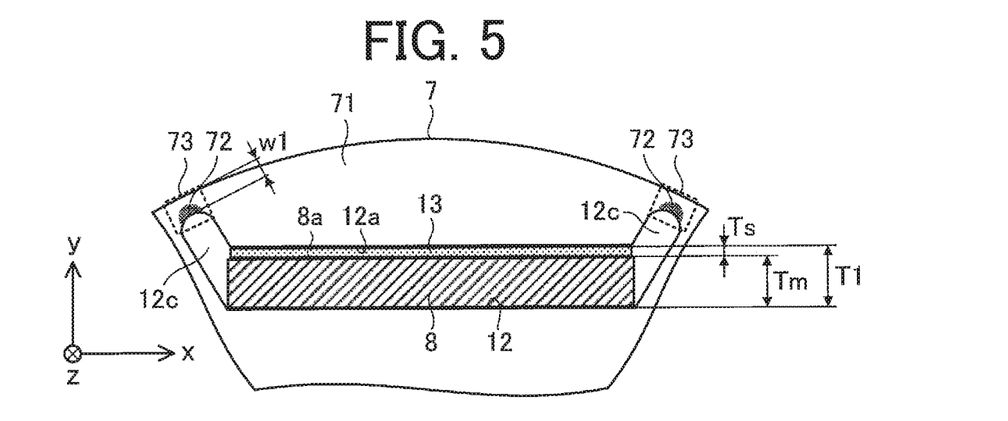
FIG. 5 is a diagram showing a structure around one magnet insertion hole of six magnet insertion holes shown in FIG. 2.
Figure 6:
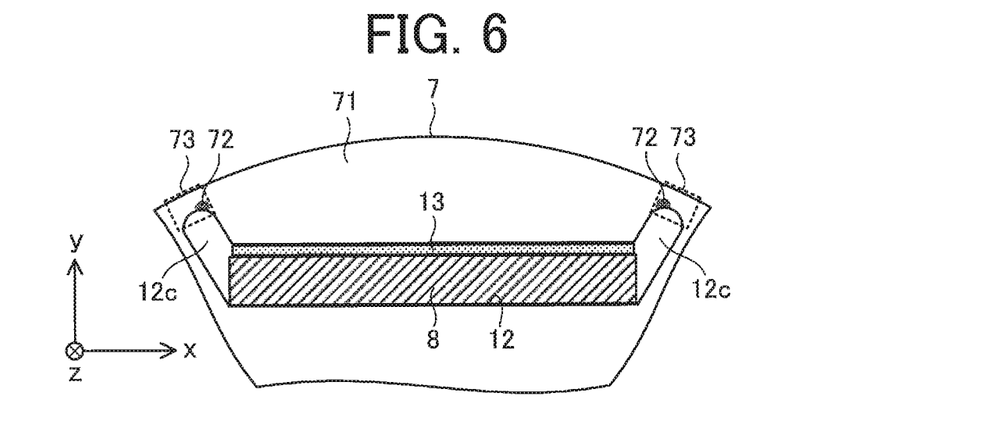
FIG. 6 is a diagram showing another example of a structure around the magnet insertion hole.
Figure 7:
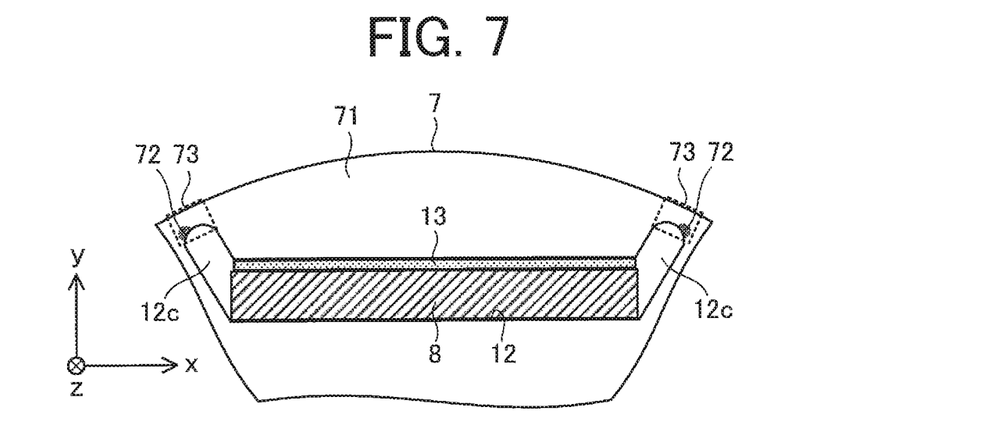
FIG. 7 is a diagram showing still another example of a structure around the magnet insertion hole.
Figure 8:
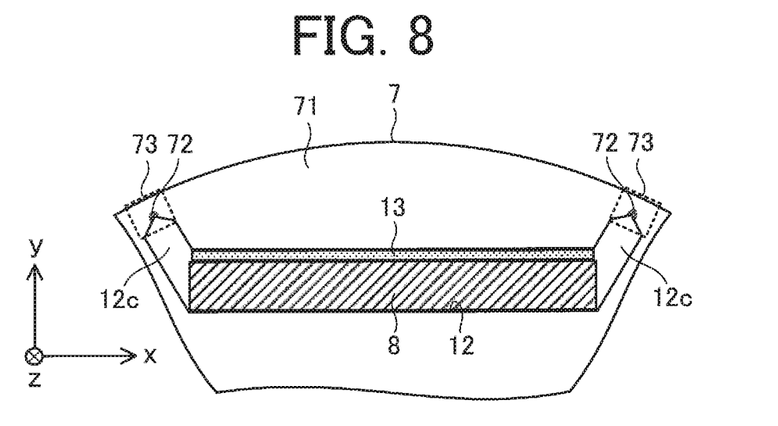
FIG. 8 is a diagram showing still another example of a structure around the magnet insertion hole.
Figure 9:
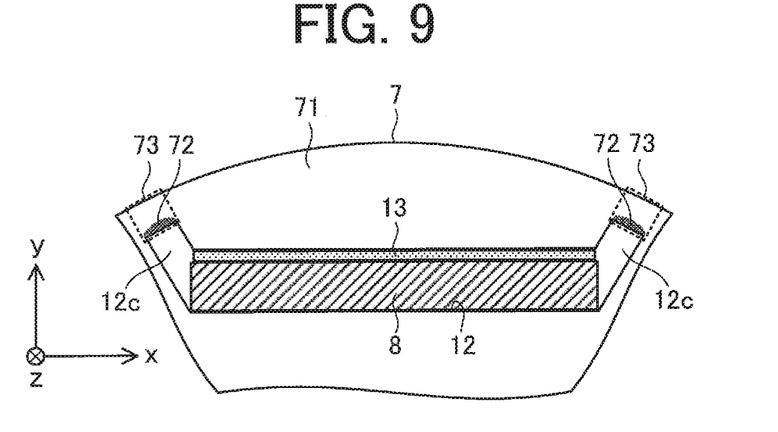
FIG. 9 is a diagram showing still another example of a structure around the magnet insertion hole.

FIG. 5 is a diagram showing a structure around one magnet insertion hole 12 of the six magnet insertion holes 12 shown in FIG. 2. In this embodiment, the structure around each of the six magnet insertion holes 12 shown in FIG. 2 is the same as the structure around the magnet insertion hole 12 shown in FIG. 5.

The first parts 71 occupy major parts of the rotor core 7. The second parts 72 are parts of the rotor core 7 other than the first parts 71. In the example shown in FIG. 5, the second part 72 adjoins the magnet insertion hole 12. The second part 72 is formed of the same material as the first part 71. For example, the second part 72 (i.e., a part that is harder than the first part 71) is formed by deforming the thin-wall part 73 in the process of manufacturing the rotor 2.

The thin-wall part 73 is situated between a region of end of the magnet insertion hole 12 in the circumferential direction and the outer edge of the rotor core 7. Specifically, the thin-wall part 73 is situated between the flux barrier 12c and the outer edge of the rotor core 7. The thin-wall part 73 includes the second part 72 as a part having higher hardness than the first part 71. The thin-wall part 73 may include a part of the first part 71.

A width w1 of the thin-wall part 73 is the minimum width of the thin-wall part 73 in the radial direction. The width w1 of the thin-wall part 73 is greater than or equal to the thickness of one electromagnetic steel sheet forming the rotor core 7 in the axial direction.

In this embodiment, the thermal conduction sheet 13 is situated outside the permanent magnet 8 in regard to the radial direction in the magnet insertion hole 12. That is, the thermal conduction sheet 13 is disposed between the outside surface 8a as the outside surface of the permanent magnet 8 in regard to the radial direction and the inner wall 12a of the magnet insertion hole 12. In other words, the thermal conduction sheet 13 is sandwiched between the outside surface 8a of the permanent magnet 8 and the inner wall 12a of the magnet insertion hole 12.

The position of the second part 72 is not limited to the example shown in FIG. 5.

Figure 10:
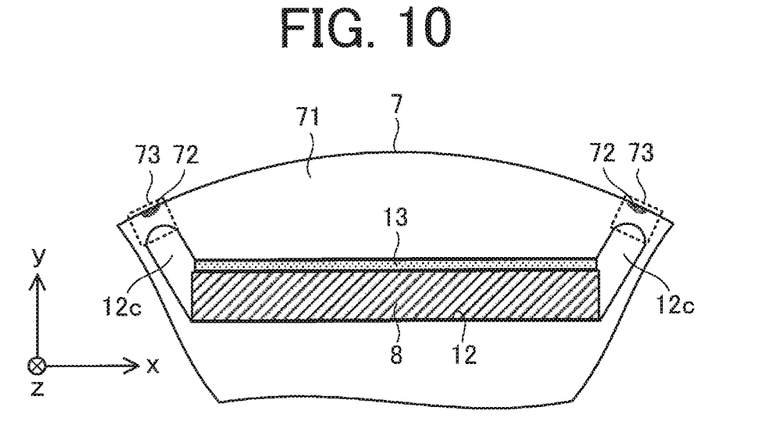
FIG. 10 is a diagram showing still another example of a structure around the magnet insertion hole.

FIG. 6 to FIG. 10 are diagrams showing other examples of the structure around the magnet insertion hole 12. As shown in FIG. 6 to FIG. 10, the position of the second part 72 may vary depending on the shape of the magnet insertion hole 12 or the like. For example, while the second parts 72 shown in FIG. 6 to FIG. 9 adjoin the magnet insertion hole 12, the second part 72 may adjoin the outer edge of the rotor core 7 as shown in FIG. 10.

Next, a manufacturing method of the rotor 2 will be described below.

Figure 11:
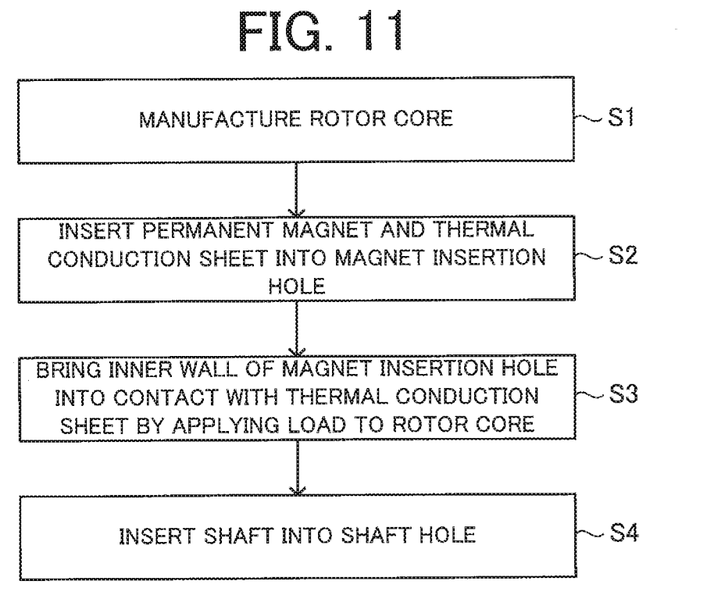
FIG. 11 is a flowchart showing an example of a process of manufacturing the rotor.

FIG. 11 is a flowchart showing an example of the process of manufacturing the rotor 2. The manufacturing method of the rotor 2 includes steps described below.

Figure 12:
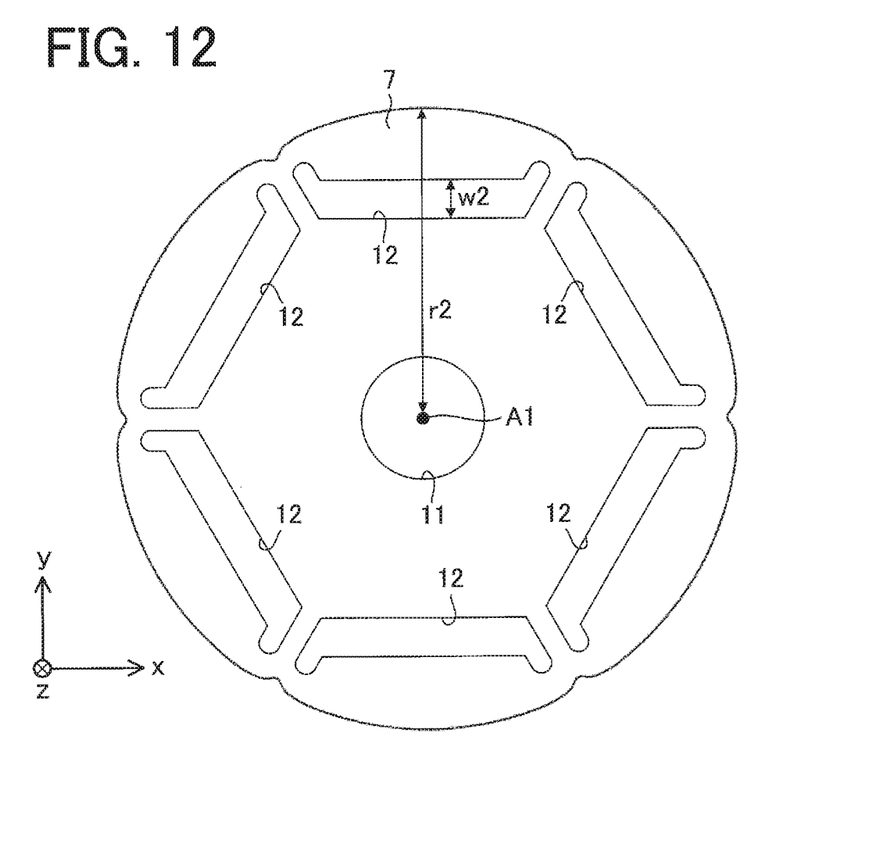
FIG. 12 is a plan view schematically showing a structure of a rotor core manufactured in the process of manufacturing the rotor.

FIG. 12 is a plan view schematically showing a structure of the rotor core 7 manufactured in step S1.

In the step S1, the rotor core 7 is manufactured. Specifically, a plurality of electromagnetic steel sheets are processed by press work (specifically, punching processing) so that a width w2 as the minimum width of the magnet insertion hole 12 in the radial direction is greater than a thickness T1 (FIG. 5) of the permanent magnet 8 and the thermal conduction sheet 13 in the radial direction in the rotor 2 as the finished product and a radius r2 is greater than a radius r1 (FIG. 2) of the rotor core 7 of the rotor 2 as the finished product. By this press work, the shaft hole 11 and the magnet insertion holes 12 are formed.

The thickness T1 shown in FIG. 5 is the sum of the thickness Tm of the permanent magnet 8 in the radial direction and the thickness Ts of the thermal conduction sheet 13 in the radial direction in the rotor 2 as the finished product. The radius r1 and the radius r2 are radii passing through the center of the magnet insertion hole 12 and the center of the shaft 10 (i.e., the axis line A1) on an xy plane.

The rotor core 7 is obtained by laminating the plurality of electromagnetic steel sheets processed by the press work in the axial direction.

Figure 13:
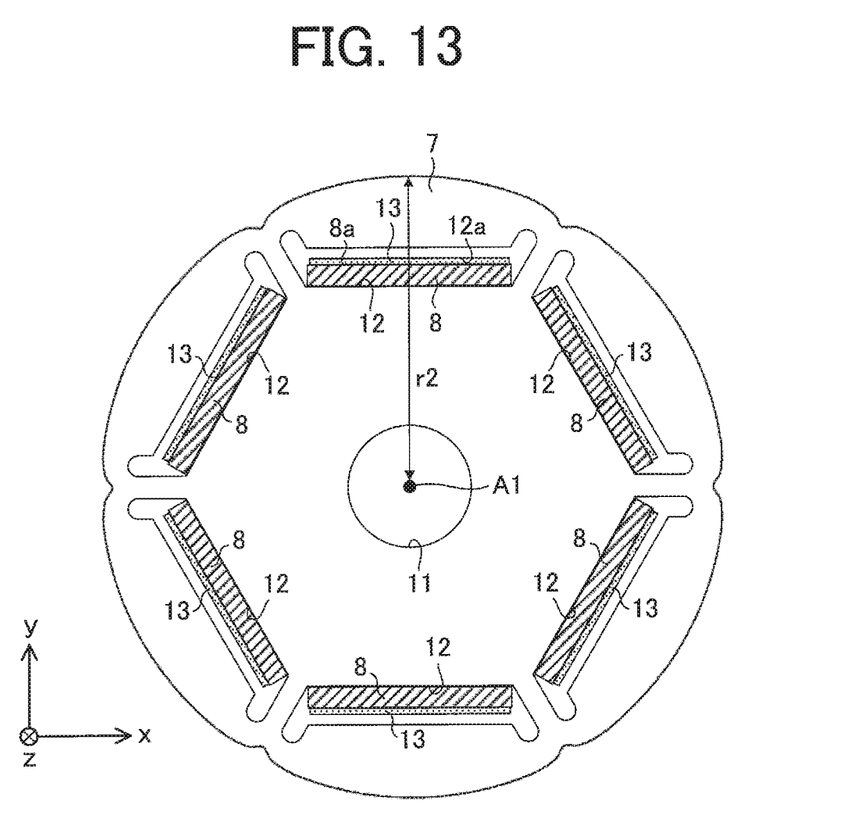
FIG. 13 is a diagram showing an example of a process of manufacturing the rotor.

FIG. 13 is a diagram showing an example of the manufacturing process in step S2.

In the step S2, the permanent magnets 8 and the thermal conduction sheets 13 are inserted into the magnet insertion holes 12 of the rotor core 7 obtained in the step S1. The thermal conduction sheet 13 is inserted between the outside surface 8a of the permanent magnet 8 and the inner wall 12a of the magnet insertion hole 12.

Figure 14:
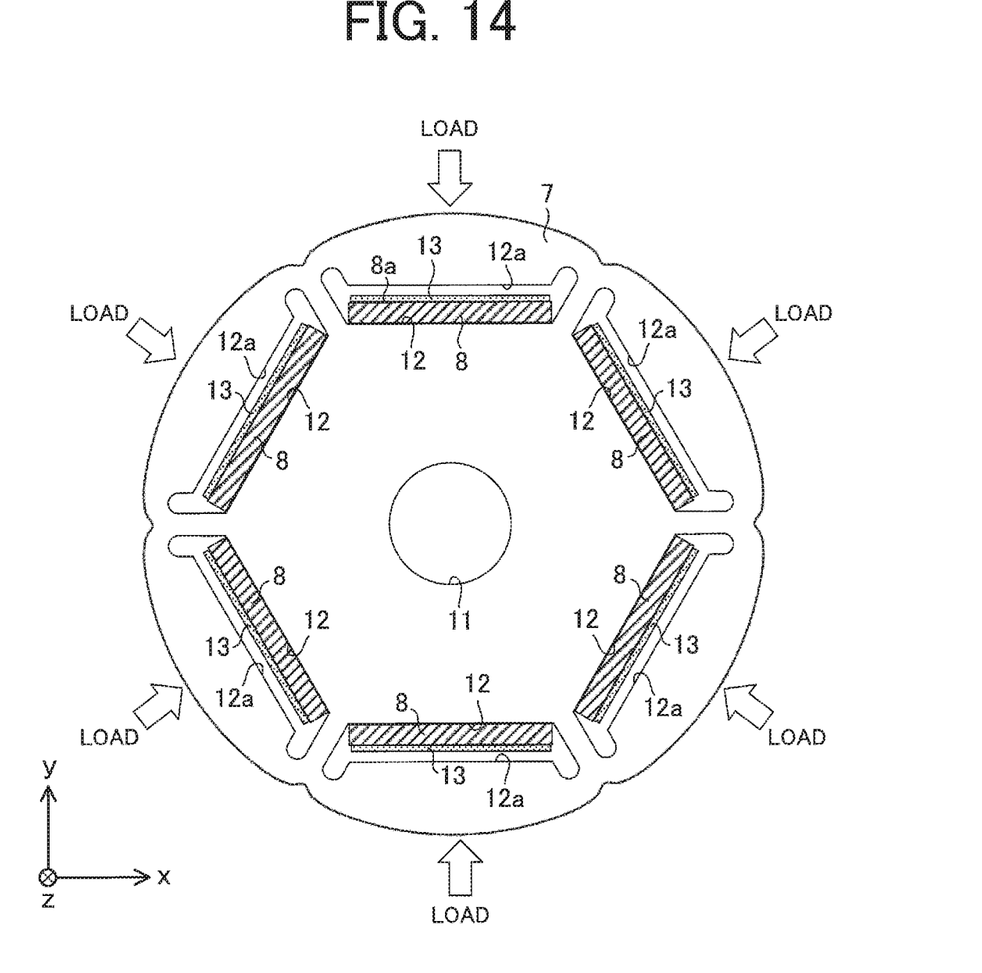
FIG. 14 is a diagram showing an example of a process of manufacturing the rotor.

FIG. 14 is a diagram showing an example of the manufacturing process in step S3.

In the step S3, the inner wall 12a of the magnet insertion hole 12 is brought into contact with the thermal conduction sheet 13 so as to deform the thermal conduction sheet 13 by applying a load inward in the radial direction from the outside of the rotor core 7. The inner wall 12a comes in contact with the thermal conduction sheet 13 tightly, and the thermal conduction sheet 13 comes in contact with the permanent magnet 8 tightly. Accordingly, the thickness of the thermal conduction sheet 13 in the radial direction decreases. The deformation of the thermal conduction sheet 13 is, for example, elastic deformation or plastic deformation, or both of them.

As a result of the processing in the step S3, deformation occurs in the thin-wall part 73, and the second part 72 (i.e., a part that is work hardened due to plastic deformation) that is harder than the first part 71 is made in the thin-wall part 73.

In step S4, the shaft 10 is inserted into the shaft hole 11 formed through the rotor core 7. Further, the end plates 9a and 9b are attached to the rotor core 7.

The rotor 2 is assembled through the process described above.

Advantages of the electric motor 1 and the manufacturing method of the rotor 2 according to the first embodiment (including the modification) will be described below.

In general, minute concavities and convexities exist on the surface of the permanent magnet used for the rotor and on the inner wall of the magnet insertion hole. Therefore, the area of the permanent magnet in contact with the inner wall of the magnet insertion hole is small in comparison with the surface area of the permanent magnet facing the inner wall of the magnet insertion hole. Accordingly, the heat generated in the permanent magnet is not efficiently discharged to the rotor core.

In this embodiment, the thermal conduction sheet 13 is disposed between the permanent magnet 8 and the inner wall 12a of the magnet insertion hole 12, and the thermal conduction sheet 13 is in contact with the permanent magnet 8 and the inner wall 12a of the magnet insertion hole 12 tightly in a state where the thermal conduction sheet 13 is deformed. Accordingly, the contact area of the permanent magnet 8 can be increased and the heat of the permanent magnet 8 is efficiently discharged to the rotor core 7 via the thermal conduction sheet 13. Consequently, the temperature of the permanent magnet 8 can be lowered efficiently.

In general, in an IPM motor of the inner rotor type, the eddy current occurring on the outside surface of the permanent magnet in regard to the radial direction is greater than the eddy current occurring on the inside surface of the permanent magnet. Therefore, the thermal conduction sheet 13 is situated outside the permanent magnet 8 in the radial direction in the magnet insertion hole 12, and thus the heat of the permanent magnet 8 can be more efficiently discharged to the rotor core 7.

In general, during the rotation of the rotor, centrifugal acts on the rotor core and the permanent magnets. In this case, the inner wall of the magnet insertion hole supports the permanent magnet and thus stress is likely to occur in the thin-wall part. Accordingly, the rotor core is likely to be deformed in the case where the strength of the thin-wall part is low. When the magnet insertion hole is deformed, the contact area of the permanent magnet decreases and the heat of the permanent magnet cannot be efficiently discharged to the rotor core.

In contrast, in this embodiment, the thin-wall part 73 includes the second part 72 that is harder than the first part 71. With this configuration, the strength of the thin-wall part 73 against the centrifugal force occurring during the rotation of the rotor 2 can be increased. Accordingly, the deformation of the rotor core 7 can be prevented even when stress occurs in the thin-wall part 73 during the rotation of the rotor 2. Consequently, the heat of the permanent magnet 8 can be efficiently discharged to the rotor core 7.

In this embodiment, the width w1 of the thin-wall part 73 is greater than or equal to the thickness of one electromagnetic steel sheet forming the rotor core 7. With this configuration, the processing of the electromagnetic steel sheets (specifically, the processing in the step S1) is facilitated and the strength of the thin-wall part 73 can be increased.

Since the electric motor 1 includes the rotor 2 described above, the electric motor 1 has the same advantages as the rotor 2. Accordingly, the motor efficiency of the electric motor 1 can be improved.

According to the manufacturing method of the rotor 2 (specifically, the processing in the step S1), by processing the electromagnetic steel sheets so that the width w2 of the magnet insertion hole 12 is greater than the thickness T1 of the permanent magnet 8 and the thermal conduction sheet 13 in the rotor 2 as the finished product, the insertion of the permanent magnet 8 and the thermal conduction sheet 13 into the magnet insertion hole 12 is facilitated. Consequently, productivity of the rotor 2 can be increased.

Further, in the processing in the step S3, the inner wall 12a of the magnet insertion hole 12 is brought into contact with the thermal conduction sheet 13 so as to deform the thermal conduction sheet 13 by applying a load inward in the radial direction from the outside of the rotor core 7. This makes the inner wall 12a be in contact with the thermal conduction sheet 13 tightly, and makes the thermal conduction sheet 13 be in contact with the permanent magnet 8 tightly. Consequently, the area of the inner wall 12a contacting the thermal conduction sheet 13 and the area of the permanent magnet 8 contacting the thermal conduction sheet 13 can be increased, by which the heat of the permanent magnet 8 can be efficiently discharged to the rotor core 7 via the thermal conduction sheet 13.

Second Embodiment

An air conditioner 50 according to a second embodiment of the present invention will be described below.

Figure 15:
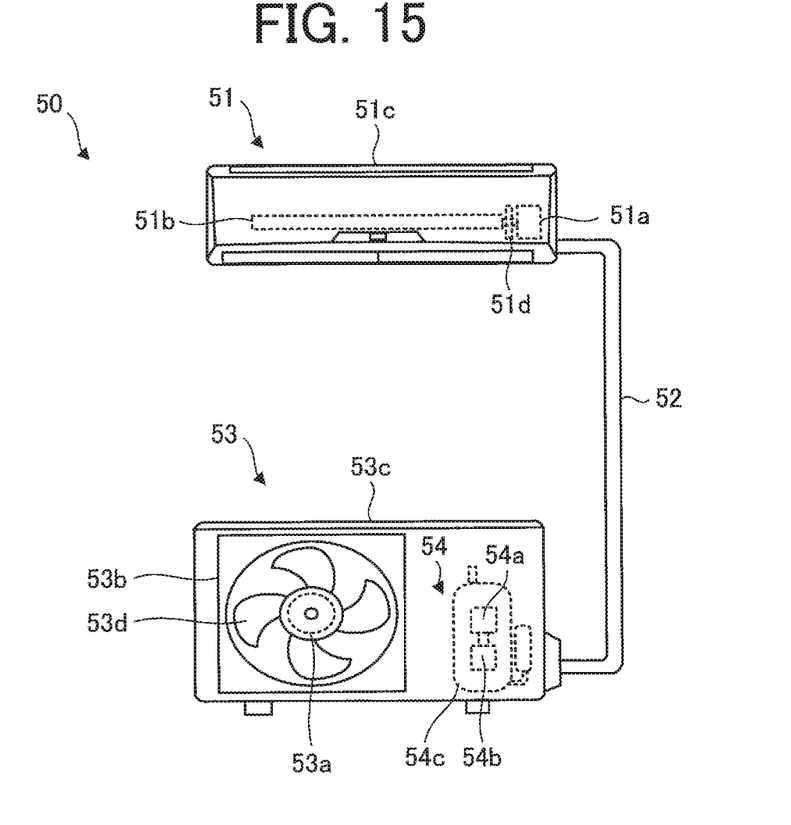
FIG. 15 is a diagram schematically showing a configuration of an air conditioner according to a second embodiment of the present invention.

FIG. 15 is a diagram schematically showing a configuration of the air conditioner 50 according to the second embodiment of the present invention.

The air conditioner 50 according to the second embodiment (e.g., refrigeration air conditioner) includes an indoor unit 51 as a blower (first blower), refrigerant piping 52, and an outdoor unit 53 as a blower (second blower) connected to the indoor unit 51 by the refrigerant piping 52.

The indoor unit 51 includes an electric motor 51a (e.g., the electric motor 1 according to the first embodiment), a blower unit 51b that blows out air by being driven by the electric motor 51a, and a housing 51c that covers the electric motor 51a and the blower unit 51b. The blower unit 51b includes, for example, a blade 51d driven by the electric motor 51*a*. For example, the blade 51*d* is fixed to a shaft of the electric motor 51*a* (e.g., the shaft 10) and generates an airflow.

The outdoor unit 53 includes an electric motor 53*a* (e.g., the electric motor 1 according to the first embodiment), a blower unit 53*b*, a compressor 54 and a heat exchanger (not shown). The blower unit 53*b* blows out air by being driven by the electric motor 53*a*. The blower unit 53*b* includes, for example, a blade 53*d* driven by the electric motor 53*a*. For example, the blade 53*d* is fixed to a shaft of the electric motor 53*a* (e.g., the shaft 10) and generates an airflow. The compressor 54 includes an electric motor 54*a* (e.g., the electric motor 1 according to the first embodiment), a compression mechanism 54*b* (e.g., refrigerant circuit) driven by the electric motor 54*a*, and a housing 54*c* that covers the electric motor 54*a* and the compression mechanism 54*b*.

In the air conditioner 50, at least one of the indoor unit 51 or the outdoor unit 53 includes the electric motor 1 described in the first embodiment (including the modification). Specifically, the electric motor 1 described in the first embodiment is employed for at least one of the electric motors 51*a* or 53*a* as the drive source for the blower unit. It is also possible to employ the electric motor 1 described in the first embodiment (including the modification) as the electric motor 54*a* of the compressor 54.

The air conditioner 50 is capable of performing operations such as a cooling operation of blowing out cool air from the indoor unit 51, or a heating operation of blowing out warm air from the indoor unit 51, for example. In the indoor unit 51, the electric motor 51*a* is the drive source for driving the blower unit 51*b*. The blower unit 51*b* is capable of blowing out conditioned air.

In the air conditioner 50 according to the second embodiment, the electric motor 1 described in the first embodiment (including the modification) is employed for at least one of the electric motors 51*a* or 53*a*, and thus advantages the same as those described in the first embodiment can be obtained. Accordingly, the efficiency of the air conditioner 50 can be improved.

Further, by employing the electric motor 1 according to the first embodiment (including the modification) as the drive source of a blower (e.g., the indoor unit 51), advantages the same as those described in the first embodiment can be obtained. Accordingly, the efficiency of the blower can be improved. A blower including the electric motor 1 according to the first embodiment and a blade (e.g., the blade 51*d* or 53*d*) driven by the electric motor 1 is usable independently as a device for blowing out air. This blower is applicable also to equipment other than the air conditioner 50.

Furthermore, by employing the electric motor 1 according to the first embodiment (including the modification) as the drive source of the compressor 54, advantages the same as those described in the first embodiment can be obtained. Accordingly, the efficiency of the compressor 54 can be improved.

The electric motor 1 described in the first embodiment can be mounted not only on the air conditioner 50 but also on equipment having a drive source, such as a ventilating fan, a household electrical appliance and a machine tool.

Features in the embodiments and the modification described above can be appropriately combined with each other.

What is claimed is:

1. A rotor comprising:
   a rare-earth magnet magnetized in a radial direction;
   a rotor core including a first part, a thin-wall part including a second part that is harder than the first part, and a magnet insertion hole in which the rare-earth magnet is inserted; and
   a thermal conduction sheet disposed between the rare-earth magnet and an inner wall of the magnet insertion hole and to conduct heat of the rare-earth magnet to the rotor core, the thermal conduction sheet being formed of a deformable material,
   wherein the thin-wall part is situated between a region of end of the magnet insertion hole in a circumferential direction and an outer edge of the rotor core, and
   the second part is a part that is work hardened due to plastic deformation.

2. The rotor according to claim 1, wherein the thermal conduction sheet is situated outside the rare-earth magnet in regard to the radial direction.

3. The rotor according to claim 1, wherein the thermal conduction sheet is in contact with the inner wall of the magnet insertion hole and the rare-earth magnet tightly in a state where the thermal conduction sheet is deformed.

4. The rotor according to claim 1, wherein the second part adjoins the magnet insertion hole.

5. The rotor according to claim 1, wherein the second part adjoins the outer edge of the rotor core.

6. The rotor according to claim 1, wherein the thin-wall part extends in the circumferential direction.

7. The rotor according to claim 1, wherein the rotor core is formed of a plurality of electromagnetic steel sheets laminated in an axial direction.

8. The rotor according to claim 7, wherein a minimum width of the thin-wall part in the radial direction is greater than or equal to a thickness of the electromagnetic steel sheet in the axial direction.

9. An electric motor comprising:
   a stator; and
   the rotor according to claim 1 disposed inside the stator.

10. A compressor comprising:
    the electric motor according to claim 9; and
    a compression mechanism driven by the electric motor.

11. An air conditioner comprising:
    an indoor unit; and
    an outdoor unit connected to the indoor unit, wherein
    at least one of the indoor unit or the outdoor unit includes the electric motor according to claim 9.

12. A manufacturing method of a rotor including: a rare-earth magnet magnetized in a radial direction; a rotor core including a first part, a thin-wall part including a second part that is harder than the first part, and a magnet insertion hole in which the rare-earth magnet is inserted; and a thermal conduction sheet formed of a deformable material, the manufacturing method comprising:
    inserting the thermal conduction sheet between the rare-earth magnet and an inner wall of the magnet insertion hole; and
    bringing the inner wall of the magnet insertion hole into contact with the thermal conduction sheet so as to deform the thermal conduction sheet and work hardening the second part due to plastic deformation, by applying a load inward in the radial direction from an outside of the rotor core.

* * * * *